Aug. 2, 1938.   L. TRAGER   2,125,596

VALVE MECHANISM FOR COMPOUND METERS

Filed April 7, 1937   2 Sheets-Sheet 2

LEON TRAGER.
INVENTOR

BY *Rob. Meyer*
ATTORNEY

Patented Aug. 2, 1938

2,125,596

UNITED STATES PATENT OFFICE 2,125,596

VALVE MECHANISM FOR COMPOUND METERS

Leon Trager, Newark, N. J., assignor to Worthington Pump and Machinery Corporation, Harrison, N. J., a corporation of Virginia Application April 7, 1937, Serial No. 135,359

5 Claims. (Cl. 251—147)

This invention relates to compound meters for measuring water or other liquids and more particularly to an automatic valve mechanism for use in such meters.

More specifically, the present invention relates to the automatic check valve and its control embodied in a compound meter of the type including the combination of a disc meter and a turbine meter with the automatic check valve controlling the inlet and outlet passages in such manner that during low rates of flow of liquid through the meter the valve will cut off all flow through a turbine meter compelling the entire flow to pass through the disc meter. When the flow of liquid increases and the drop in pressure due to such increased flow reaches a predetermined amount, the automatic check valve opens and allows the liquid to pass through the turbine element as well as through the disc element.

Various structures have been provided for controlling the operation of the automatic check valve in such measuring devices, as for instance the lever and sliding weight structure, the straight weighted valve, and articulated lever and weight structures, all of which have operated successfully but not with entire satisfaction or with the degree of accuracy, sensitivity and perfection required to provide a maximum degree of accuracy and efficiency in a measuring device of the type above specified.

The present invention comprises a weighted lever system operating in conjunction with valve carried rollers for holding the check valve on its seat which is so constructed and arranged that in closed position, the weights exert the maximum possible pressure to hold the valve closed, and in open position the levers are positioned so that the pressure between the weighted arms and the valve carried rollers is normal to the axis of the valve and therefore has no component tending to either open or close the valve.

With these and other objects in view, as may appear from the accompanying specification, the invention consists of various features of construction and combination of parts, which will be first described in connection with the accompanying drawings, showing a compound meter embodying the invention, and the features forming the invention will be specifically pointed out in the claims.

Figure 1:
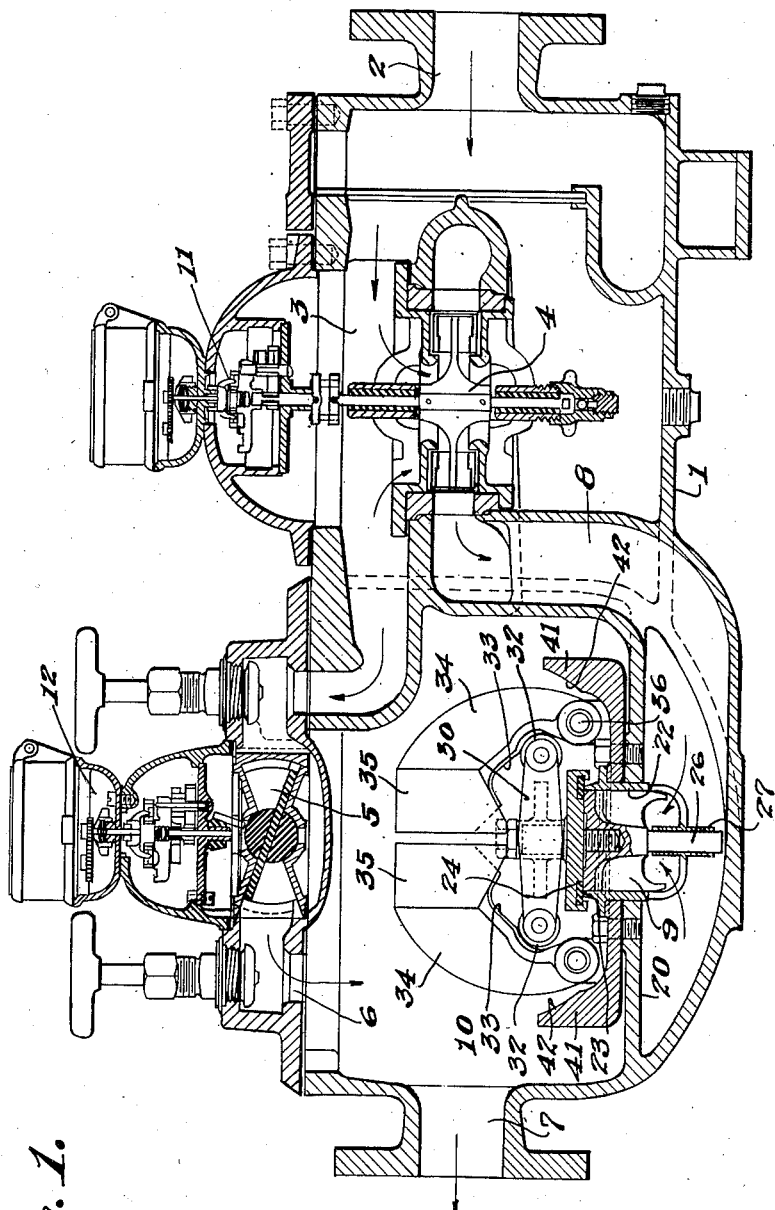
Figure 1 is a vertical longitudinal section through a compound meter of approved type having the present invention incorporated therein.

Referring more particularly to the drawings, the compound meter includes the casing 1 having an inlet 2 for the water or liquid to be measured and a fluid passage 3 leading to both the turbine measuring element 4 and the disc measuring element 5. From the disc measuring 5 the liquid flows through the discharge passage 6 and to and through the outlet 7 of the casing 1. From the turbine measuring element 4 the water or other liquid flowing through the meter passes through the passageway 8, through the check valve structure 9 into the discharge chamber 10 and out through the outlet 7.

The turbine element 4 and the disc element 5 are of any approved type of turbine and disc measuring elements or meters and they have the usual approved type of registering mechanisms 11 and 12 associated therewith respectively.

During low or diminished flow of liquid through the meter, the valve structure 9 is held closed in the manner hereinafter more specifically referred to which prevents the flow of the liquid through the turbine measuring element 4 and when the turbine element and passage 8 become filled with the liquid the remaining liquid must necessarily flow through the passage 3 and through the disc measuring element 5, out through the passage 6 into the discharge chamber 10 and thence out of the measuring device or meter. When the flow of liquid through the meter increases, as upon increased demands for the liquid, the pressure drop in the liquid due to the increased flow causes the valve structure 9 to open permitting a flow of the liquid through the turbine element 4 as well as through the disc measuring element 5 and both of these elements operate and register on their respective recording mechanisms the quantity of liquid flowing through the meter.

Figure 2:
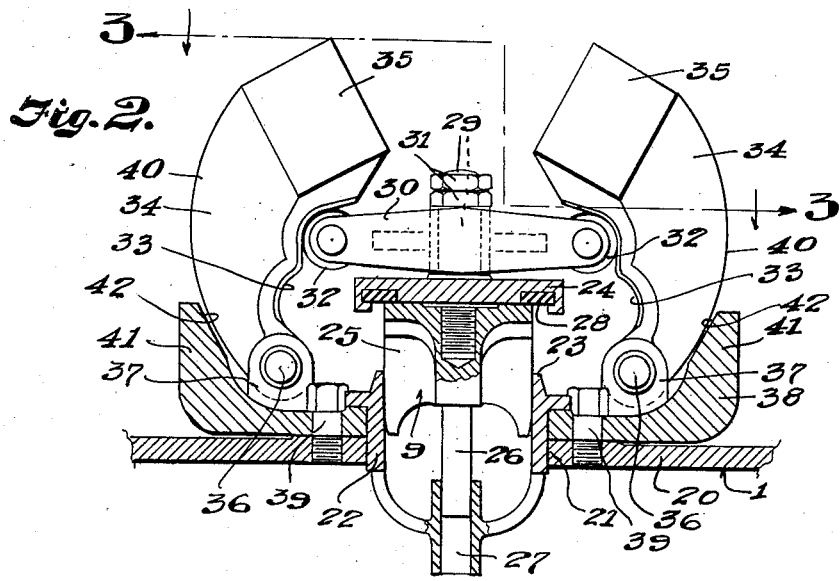
Figure 2 is a fragmentary vertical section through the check valve and its controlling mechanism.
Figure 3:
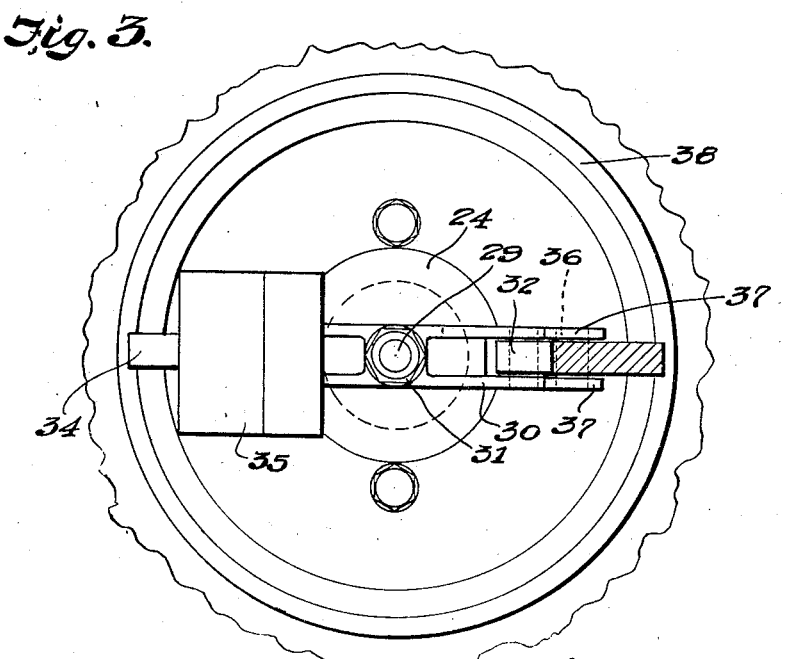
Figure 3 is a view partly in top plan and partly in horizontal section of the valve and its controlling means and taken on the line 3—3 of Figure 2.

The improved valve structure 9 and its controlling mechanism are clearly shown in Figures 1 to 3 of the drawings, the valve being shown in closed position in Figure 1 and in open position in Figure 2.

The partition 20 in the meter casing 1 has an opening 21 therein in which is seated the valve cage 22 through which the liquid flows. The valve cage 22 has a valve seat 23 formed thereon against which the disc valve 24 fits to cut off the flow of liquid through the valve structure. In the drawings, the disc valve 24 is shown of the wing valve type having the wings 25 thereon and a guiding stem 26 which operates in a guide 27 formed on the cage 22 and it is also shown as having a flexible insert 28 therein which engages the seat 23. These are features of construction which may be varied if desired without departing from the spirit of the present invention.

The disc valve 24 has a stem 29 projecting axially from its upper side and an arm 30 is mounted on the stem 29 and held rigidly thereon by means of suitable nuts 31. The arm 30 projects diametrically of the disc valve 24 and has rollers 32 rotatably carried by its outer ends. The rollers 32 engage and ride over the concavely curved tracks or inner edges 33 of the pivoted weighted levers 34. The weights 35 are either formed integrally with or rigidly attached to the levers 34. The levers 34 are pivotally mounted by means of trunnions 36 and suitable wings 37. The wings 37 are carried by the supporting base and stop structure 38 which is in turn detachably connected in any suitable manner such as by bolts 39 to the partition 20. The outer edges 40 of the pivoted levers 34 are curved as clearly shown in Figures 1 and 2 of the drawings and the weights 35 are shaped and positioned for distributing or regulating the pressure of the weights so that the weights cooperating with the rollers 32, the arm 30 and the concavely curved track 33 will, when the valve is held closed as shown in Figure 1 of the drawings, exert the maximum pressure for holding the valve closed and so that when the valve is open and the rollers 32 engage in the outermost or uppermost concave portions of the tracks 33, the pressure between the weighted arms and the rollers will be normal to the axis of the valve 24 and they therefore will have no component tending to either open or close the valve.

This particular construction and arrangement of the levers 34, weights 35 and rollers 32 will provide positive maximum closing pressure on the valve, holding it firmly closed until the flow of liquid through the meter is such as to positively open the valve. Upon the opening of the valve, the rollers riding from the first or lowermost concave portions of the track 32 into the second or uppermost concave portions will swing the levers 34 outwardly on their pivots and when the rollers engage in these outermost concave portions of the tracks a stop will be provided for further opening movement of the valve and the levers 34 and weights 35 will be held sustained providing a sensitive means whereby upon the decrease in the flow of liquid the valve will be promptly and positively closed thereby preventing reduced or dribbling flow through the turbine meter and insuring maximum measuring accuracy of the meter.

The combined support and stop member 38 has stop projections 41 formed thereon which have arcuate or inclined surfaces 42 against which the curved edges 40 of the levers 34 may engage to prevent backward swinging of the weighted levers in case they are suddenly and quickly forced into open position.

As noted by particular reference to Figure 1 of the drawings the weights 35 slightly over-hang the free ends of the levers 34 and they increase in length at their inner facing sides providing lower inclined surfaces and increased weight at their lower inner corners which not only facilitates the exertion of maximum pressure when the valve is closed but facilitates the rather delicate balancing of the weights when the valve is open and their quick closing movement.

It is to be understood that the invention is not to be limited to the specific construction or arrangement of parts shown but that they may be widely modified within the invention defined by the claims.

What is claimed is:

1. In a compound meter, a vertically movable valve for controlling the flow of liquid therethrough and adapted to be opened by pressure there against and closed by its own weight, pivotally mounted weighted levers co-acting with said valve to hold the valve closed under predetermined conditions and to be moved by said valve upon opening of the valve, said levers mounted and having their weights disposed so that when the valve is open the pressure of the weights will be substantially normal to the axis of the valve.

2. In a compound meter, a valve for controlling the flow of liquid therethrough, pivotally mounted weighted levers on opposite sides of the axis of the valve co-acting with said valve to hold it closed under predetermined conditions and to be moved by said valve upon opening of the valve, rollers carried by said valve and engaging said weighted levers, said levers mounted and having their weights so disposed and co-acting with said rollers in such manner that when the valve is open the pressure of the weights and rollers will be substantially normal to the axis of the valve.

3. In a compound meter, an axially movable valve for controlling the flow of liquid therethrough, pivotally mounted weighted levers on opposite sides of the axis of the valve co-acting with said valve to hold it closed under predetermined conditions and to be moved by said valve upon opening of the valve, rollers carried by said valve, said levers having curved tracks on their inner edges which are engaged by said rollers, said tracks each having concave portions for receiving said rollers when the valve is closed and each having second concave portions for receiving the rollers when the valve is open, said weighted levers, rollers and concave portions arranged whereby the weighted levers will exert maximum closing pressure on the valve when the valve is closed and whereby the pressure of the weights and rollers will be substantially normal to the axis of the valve when the valve is open.

4. In a compound meter, an axially movable valve for controlling the flow of liquid therethrough, pivotally mounted weighted levers on opposite sides of the axis of the valve and co-acting with said valve to hold it closed under predetermined conditions and to be moved by said valve upon opening of the valve, rollers carried by said valve, said levers having curved tracks on their inner edges which are engaged by said rollers, said tracks each having concave portions for receiving said rollers when the valve is closed and each having second concave portions for receiving the rollers when the valve is open, said weighted levers, rollers and concave portions arranged whereby the weighted levers will exert maximum closing pressure on the valve when the valve is closed and whereby the pressure of the weights and rollers will be substantially normal to the axis of the valve when the valve is open, and stops for preventing excessive opening movement of said weighted levers.

5. In a compound meter, an axially movable valve for controlling the flow of liquid therethrough, pivotally mounted weighted levers on opposite sides of the axis of the valve coacting with the valve to hold it closed under predetermined conditions and to be moved by said valve upon opening of the valve, rollers carried by the valve, said weighted levers and rollers arranged whereby the weighted levers will assert maximum closing pressure on the valve when it is closed and whereby the pressure of the weights and rollers will be substantially normal to the axis of the valve when the valve is open, and stops independent of said levers and rollers for limiting the opening movement of the valve.

LEON TRAGER.